H. FRIEDMANN.
LACE MEASURING AND WINDING MACHINE.
APPLICATION FILED MAY 5, 1911.

1,000,167.

Patented Aug. 8, 1911.

2 SHEETS—SHEET 1.

WITNESSES

INVENTOR
Hans Friedmann
BY
Sigmund Herzog
his ATTORNEY

H. FRIEDMANN.
LACE MEASURING AND WINDING MACHINE.
APPLICATION FILED MAY 5, 1911.
1,000,167.
Patented Aug. 8, 1911.
2 SHEETS—SHEET 2.
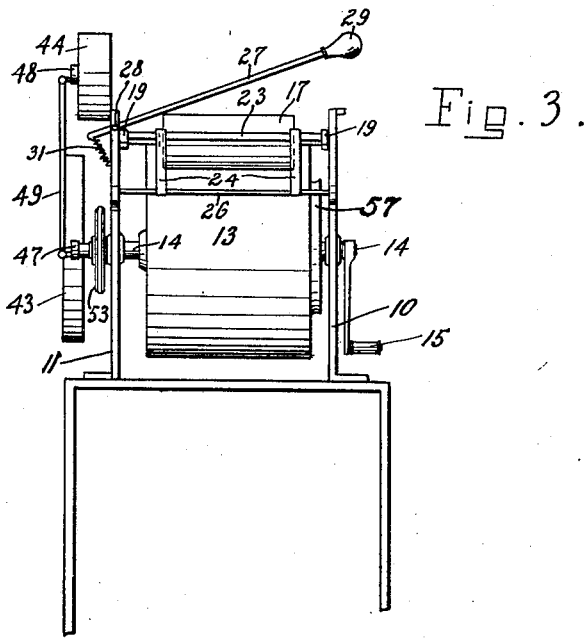
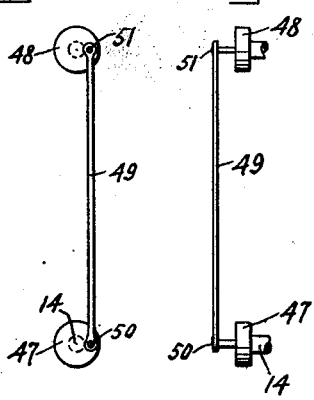 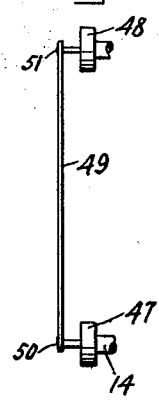 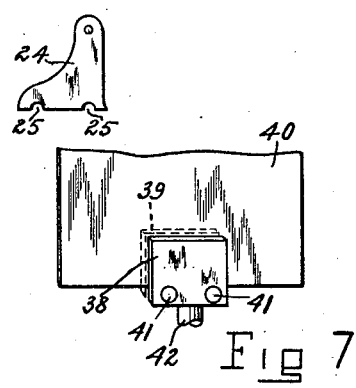

UNITED STATES PATENT OFFICE.

HANS FRIEDMANN, OF NEW YORK, N. Y.

LACE MEASURING AND WINDING MACHINE.

1,000,167.  Specification of Letters Patent.  Patented Aug. 8, 1911.

Application filed May 5, 1911. Serial No. 625,363.

*To all whom it may concern:*

Be it known that I, HANS FRIEDMANN, a subject of the German Emperor, and resident of the city of New York, in the county of New York and State of New York, have invented certain new and useful Improvements in Lace Measuring and Winding Machines, of which the following is a specification.
The present invention relates to lace measuring and winding machines, and has for one of its objects to provide a simple and accurate device of this class which may be attached to a table or other similar support, and whereby the lace or other fabric is measured and re-wound simultaneously.

Another object of the invention is to devise a simple connection between the measuring and register means, whereby errors in measurement are excluded.

With these and other objects in view, which will appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1:
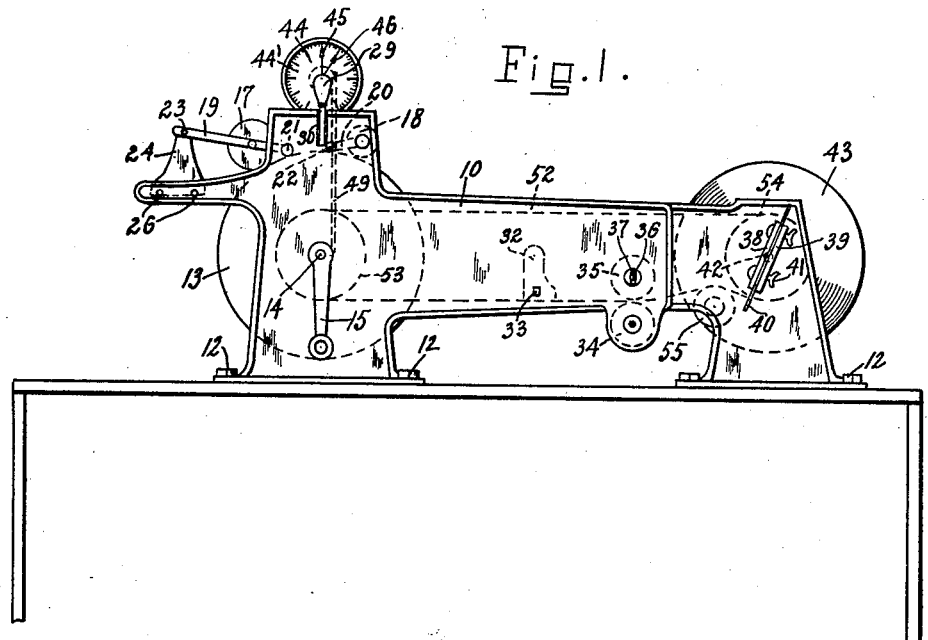
Figure 2:
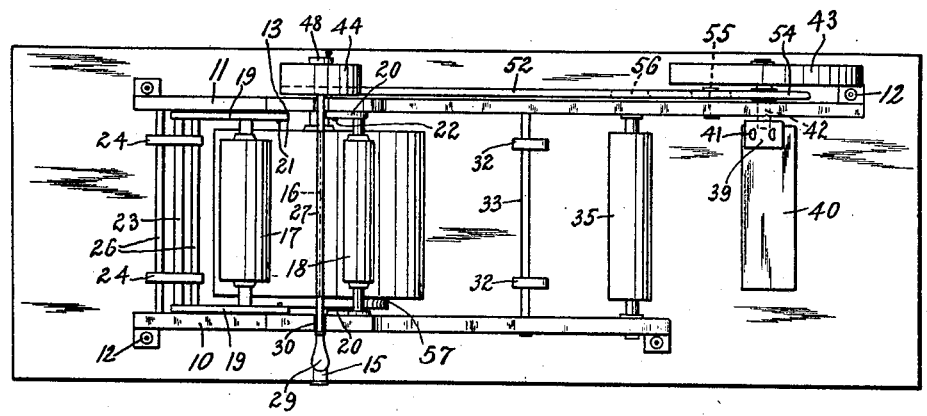

Figure 1 is a side elevation of an apparatus constructed in accordance with the present invention; Fig. 2 is a plan view thereof;
Fig. 3 is a front elevation of the same; Fig. 4 is a side elevation of the connecting means between the measuring and register devices; Fig. 5 is a side elevation of the means shown in Fig. 4; Fig. 6 is a side elevation of one of the guides upon the apparatus; and Fig. 7 is a perspective view of the winding means.

In the drawings, the numerals 10 and 11 indicate the main frame members of the apparatus, which may be attached by means of screws 12, 12, or otherwise, to a table or support. In these frame members is rotatably journaled the measuring roller or drum 13, which is of a predetermined size, for instance one yard in circumference, its shaft 14 being provided with an operating crank 15. This roller is, preferably, covered with a suitable fabric, which will prevent the slipping of the lace to be measured, and this fabric is provided with a transverse mark 16 upon the periphery of the roller, which indicates the starting point. Two tension rollers 17 and 18 contact throughout their lengths with the measuring roller 13. These rollers are rotatably supported by levers 19, 19 and 20, 20, respectively. The levers are pivoted at 21 and 22, respectively, to the frame members 10 and 11. The levers 19, 19 carry at their outer ends a transverse rod 23, upon which are slidably arranged guides 24, 24, the lower surfaces of which are provided with recesses 25, 25, engaging transverse rods 26, 26, which connect the frame members 10 and 11. A lever 27 is pivoted at 28 to the frame member 11, and provided at its free end with a handle 29, by means of which this lever is adapted to be shifted into the recess 30 in the frame member 10 so that the lower surface of this lever will contact with a measuring roller 13, for a purpose hereinafter to be described. A spring 31, attached to the lever 27 and the frame 11, tends to hold this lever always in its elevated position, shown in Fig. 3 of the drawings.

From the measuring roller 13 the lace is conducted between two guides 32, 32, which are shiftably arranged upon a cross bar 33, to and between advancing rollers 34 and 35. The roller 34 is rotatably mounted in the frame members 10 and 11, and the roller 35, which acts as a tension roller, is provided with spindles 36, 36, which engage substantially vertical slots 37 in the frame members 10 and 11. Thence the lace passes to the winding mechanism, which comprises plates 38 and 39, between which is held the lace board or card 40 by means of clamping screws 41, 41. The plate 38 is attached to a spindle 42, which is journaled in the frame member 11, and provided upon its outer end with a fly-wheel 43, for the well known purpose.

A register 44 is supported by the frame member 11, and comprises a structure in the form of a clock having a dial 44', divided into twelve equal parts, which parts are subdivided into twelve sub-divisions. Two hands 45 and 46 are actuated by a gearing in such a manner that the hand 45 makes one complete turn while the hand 46 is being shifted one-twelfth of a revolution. The register and the measuring drum 13 are connected in such a manner that one revolution of the measuring drum will result in one complete turn of the hand 45. This could be accomplished in many ways, and the device shown in Figs. 4 and 5 of the drawings is disclosed for the purposes of illustration only. In this device disks 47 and 48 are attached to the shaft 14 of the drum 13 and the main shaft of the register 44, respectively. These disks are connected by a bar 49, which is pivoted at 50 and 51 to the disks 47 and 48, respectively, and in such a manner that the angular relation between the shaft of the register and the pivot 51, and between the shaft 14 of the drum 13 and the pivot 50 is the same. Obviously by means of this arrangement, as the drum 13 is rotated, the hand 45 of the register will move accordingly. The disks 47 and 48 are keyed or otherwise attached to their respective shafts in such a manner, that the mark 16 coincides with the lever 27, when the hand 45 of the register points to zero upon the dial 44'. Rotation is imparted to the winding-up mechanism and to the roller 34 by a belt 52, which runs over a pulley 53, attached to the shaft 14 of the drum 13, a pulley 54, carried by the spindle 42 of the winding-up mechanism, an idler 55, and a pulley 56, fastened to the shaft of the roller 34.

The operation of the device is as follows: When starting the measuring, preferably, both hands are placed upon the zero point of the register, in which position, of course, the mark 16 will register with the lever 27, when the latter is forced into contact with the drum. The guides 24 and 32 are then shifted on their supports to a distance from each other, which corresponds to the width of the lace or other fabric to be measured and wound. The free end of the lace is then passed between the guides 24, between the rollers 17 and 13, and brought to coincide with the mark 16 upon the roller 13. As now the operating crank 15 is turned, the free end of the lace will pass below the roller 18, which is lifted so that the lace can pass through the same and the measuring roller, and then again released. In the further rotation of the measuring drum, the lace will pass between the guides 32 to the rollers 34 and 35, and advanced by the latter to the empty lace board or card 40, to which it is then attached. The crank 15 is then further rotated until the inner end of the lace is in alinement with the depressed lever 27, when the amount of lace measured can be easily ascertained from the position of the hands upon the dial of the register. This having been done, the crank is further rotated until the lace has been transferred entirely onto the board 40.

Instead of hand power, foot power may be used for actuating the machine, and for this purpose a pulley 57 is attached to the drum 13, which can be engaged by a belt to be operated through the intermediary of a suitable mechanism by a foot lever.

The rollers 17, 18, 34 and 35 are, preferably, covered by a fabric.

What I claim is:

1. In a lace measuring and winding machine, the combination with a measuring drum, of a winding mechanism for receiving the lace after it has been measured, a register actuated by said measuring drum and connected with the latter so as to move in unison therewith, advancing rollers between said drum and said winding mechanism, means for rotating said drum, and a driving connection between said drum, one of said advancing rollers and said winding mechanism.

2. In a lace measuring and winding machine, the combination with a frame, of a measuring drum rotatably mounted thereon, a winding mechanism for receiving the lace after it has been measured, tension rollers shiftably carried by said frame and contacting normally with said drum, a register actuated by said measuring drum and connected with the latter so as to move in unison therewith, advancing rollers between said drum and winding mechanism, means for rotating said drum, and a driving connection between said drum, one of said advancing rollers and said winding mechanism.

3. In a lace measuring and winding machine, the combination with a measuring drum, of a winding mechanism for receiving the lace after it has been measured, a register actuated by said measuring drum and connected with the latter so as to move in unison therewith, advancing rollers between said drum and said winding mechanism, means for rotating said drum, a driving connection between said drum, one of said advancing rollers and said winding mechanism, and guiding means for the lace in front of said drum and between said drum and advancing rollers.

4. In a lace measuring and winding machine, the combination with a frame, of a measuring drum rotatably mounted thereon, a winding mechanism for receiving the lace after it has been measured, tension rollers slidably carried by said frame and contacting normally with said drum, a register actuated by said measuring drum and connected with the latter so as to move in unison therewith, advancing rollers between said drum and said winding mechanism, means for rotating said drum, a driving connection between said drum, one of said advancing rollers and said winding mechanism, and guiding means for the lace in front of said drum and between said drum and advancing rollers.

Signed at New York, in the county of New York and State of New York, this 29th day of April, A. D. 1911.

HANS FRIEDMANN.

Witnesses:
SIGMUND HERZOG,
S. BIRNBAUM.

Copies of this patent may be obtained for five cents each, by addressing the "Commissioner of Patents, Washington, D. C."